United States Patent
Wo et al.

(10) Patent No.: US 11,851,573 B2
(45) Date of Patent: Dec. 26, 2023

(54) SOLVENT-BORNE COATING COMPOSITIONS, COATINGS FORMED THEREFROM, AND METHODS OF FORMING SUCH COATINGS

(71) Applicant: PPG Industries Ohio, Inc., Cleveland, OH (US)

(72) Inventors: Yaqi Wo, Allison Park, PA (US); David R. Fenn, Allison Park, PA (US); Matthew S. Luchansky, Wexford, PA (US); Shanti Swarup, Allison Park, PA (US); Diane L. Wargo, Allison Park, PA (US); Xiangling Xu, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 261 days.

(21) Appl. No.: 17/290,214

(22) PCT Filed: Nov. 1, 2019

(86) PCT No.: PCT/US2019/059325
§ 371 (c)(1),
(2) Date: Apr. 29, 2021

(87) PCT Pub. No.: WO2020/092868
PCT Pub. Date: May 7, 2020

(65) Prior Publication Data
US 2021/0403745 A1    Dec. 30, 2021

Related U.S. Application Data

(60) Provisional application No. 62/754,140, filed on Nov. 1, 2018.

(51) Int. Cl.
| | | |
|---|---|---|
| *C09D 133/08* | (2006.01) | |
| *C08F 222/10* | (2006.01) | |
| *C08F 220/18* | (2006.01) | |
| *B05D 7/00* | (2006.01) | |
| *C08F 220/06* | (2006.01) | |
| *C08F 220/20* | (2006.01) | |
| *C08K 5/3492* | (2006.01) | |
| *C08K 5/42* | (2006.01) | |
| *C08L 67/00* | (2006.01) | |
| *B05D 7/14* | (2006.01) | |

(52) U.S. Cl.
CPC .......... *C09D 133/08* (2013.01); *B05D 7/542* (2013.01); *C08F 220/06* (2013.01); *C08F 220/1808* (2020.02); *C08F 220/1811* (2020.02); *C08F 220/20* (2013.01); *C08F 222/102* (2020.02); *C08K 5/34922* (2013.01); *C08K 5/42* (2013.01); *C08L 67/00* (2013.01); *B05D 7/14* (2013.01)

(58) Field of Classification Search
None
See application file for complete search history.

(56) References Cited

U.S. PATENT DOCUMENTS

| | | | |
|---|---|---|---|
| 4,154,891 A | 5/1979 | Porter, Jr. et al. | |
| 5,066,698 A * | 11/1991 | Hazan .................. | C09D 183/04 524/269 |
| 6,646,049 B2 * | 11/2003 | Ramesh ................. | C08G 63/91 525/131 |
| 2004/0161538 A1 * | 8/2004 | Boehme ............... | C09D 151/08 427/372.2 |
| 2009/0023862 A1 * | 1/2009 | Coca .................... | C09D 133/06 525/194 |
| 2011/0195262 A1 | 8/2011 | Adachi | |
| 2015/0353759 A1 * | 12/2015 | Xin ....................... | C09D 125/14 524/521 |
| 2017/0355875 A1 * | 12/2017 | Klein ................. | C08G 18/6229 |

FOREIGN PATENT DOCUMENTS

| | | | |
|---|---|---|---|
| JP | 58147467 A | * | 9/1983 |
| JP | S58147467 A | | 9/1983 |
| JP | 2003165946 A | | 6/2003 |
| SU | 618052 A3 | | 7/1978 |
| WO | 92/05225 A1 | | 4/1992 |

OTHER PUBLICATIONS

JP-58147467-A, Sep. 1983, Derwent ab., Machine translation (Year: 1983).*

* cited by examiner

*Primary Examiner* — Satya B Sastri
(74) *Attorney, Agent, or Firm* — Krisanne Shideler

(57) ABSTRACT

A coating composition includes: (a) a carboxylic acid functional polyol polymer; (b) a melamine-formaldehyde crosslinker reactive with the carboxylic acid functional polyol polymer; (c) an acid catalyst; and (d) a non-aqueous liquid medium. The carboxylic acid functional polyol polymer has an acid value within a range of from 30 to 120 mg KOH/g and a hydroxyl value within a range of from 60 to 150 mg KOH/g. The melamine-formaldehyde crosslinker includes imino and methylol groups that together make up 35 mole % or less of the total functionality of the melamine-formaldehyde crosslinker, and butyl groups and isobutyl groups that together make up 5 mole % or greater of the total functionality of the melamine-formaldehyde crosslinker. The coating composition cures at a temperature of 100° C. or less.

13 Claims, No Drawings

SOLVENT-BORNE COATING COMPOSITIONS, COATINGS FORMED THEREFROM, AND METHODS OF FORMING SUCH COATINGS

FIELD OF THE INVENTION

The present invention relates to solvent-borne coating compositions, coatings formed therefrom, and methods of forming such coatings.

BACKGROUND OF THE INVENTION

Coatings are applied to a wide variety of substrates to provide color and other visual effects, corrosion resistance, abrasion resistance, chemical resistance, and the like. In addition, various types of coatings, such as coatings applied to automotive substrates, including vehicles and motorcycles, can be formed from compositions that can be baked and formed at low cure temperatures. However, it is difficult to efficiently cure solvent-borne compositions at low temperatures. It is accordingly an objective of the present invention to provide a solvent-borne coating composition that can be cured at comparatively low temperatures.

SUMMARY OF THE INVENTION

The present invention relates to a coating composition comprising: (a) a carboxylic acid functional polyol polymer; (b) a melamine-formaldehyde crosslinker reactive with the carboxylic acid functional polyol polymer; (c) an acid catalyst; and (d) a non-aqueous liquid medium. The carboxylic acid functional polyol polymer has an acid value within a range of from 30 to 120 mg KOH/g and a hydroxyl value within a range of from 60 to 150 mg KOH/g. The melamine-formaldehyde crosslinker comprises imino and methylol groups that together comprise 35 mole % or less of the total functionality of the melamine-formaldehyde crosslinker, and butyl groups and isobutyl groups that together comprise 5 mole % or greater of the total functionality of the melamine-formaldehyde crosslinker. The coating composition cures at a temperature of 100° C. or less.

The present invention also relates to substrates at least partially coated with the coating compositions described herein.

The present invention further relates to a method of forming a coating over at least a portion of a substrate comprising applying a coating composition as described herein and curing the coating composition at a temperature of 100° C. or less to form a coating over at least a portion of the substrate.

DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" polymer, "a" crosslinker, and the like refer to one or more of any of these items.

As previously described, the present invention is directed to a coating composition comprising a carboxylic acid functional polyol polymer, a melamine-formaldehyde crosslinker reactive with the carboxylic acid functional polyol polymer, an acid catalyst, and a non-aqueous liquid medium.

As used herein, a "polyol polymer" refers to a polymer having two or more, such as three or more, hydroxyl functional groups. Further, the term "polymer" refers to oligomers and homopolymers (e.g., prepared from a single monomer species), copolymers (e.g., prepared from at least two monomer species), terpolymers (e.g., prepared from at least three monomer species), and graft polymers. The term "resin" is used interchangeably with "polymer." Thus, a "carboxylic acid functional polyol polymer" refers to a polymer comprising hydroxyl functional groups and carboxylic acid functional groups.

It is appreciated that the carboxylic acid functional polyol polymer acts as a film-forming resin. As used herein, a "film-forming resin" refers to a self-supporting continuous film on at least a horizontal surface of a substrate upon removal of any diluents or carriers present in the composition or upon curing. The terms "curable", "cure", and the like, as used in connection with a coating composition, means that at least a portion of the components that make up the coating composition are polymerizable and/or crosslinkable. Cure, or the degree of cure, can also be determined by dynamic mechanical thermal analysis (DMTA) using a Polymer Laboratories MK III DMTA analyzer conducted under nitrogen in which the degree of cure can for example be at least 10%, such as at least 30%, such as at least 50%, such as at least 70%, or at least 90% of complete crosslinking as determined by DMTA.

The coating composition of the present invention can be cured at ambient conditions, with heat, or with other means such as actinic radiation. The term "actinic radiation" refers to electromagnetic radiation that can initiate chemical reactions. Actinic radiation includes, but is not limited to, visible light, ultraviolet (UV) light, X-ray, and gamma radiation. Further, "ambient conditions" refers to the conditions of the surrounding environment (e.g., the temperature, humidity, and pressure of the room or outdoor environment in which the substrate is located such as, for example, at a temperature of 23° C. and at a relative humidity in the air of 35% to 75%).

The carboxylic acid functional polyol polymer of the present invention can be obtained from reactants comprising (i) an ethylenically unsaturated compound comprising hydroxyl functional groups, (ii) an ethylenically unsaturated compound comprising carboxylic acid functional groups, or an anhydride thereof, and (iii) an ethylenically unsaturated compound that is different from (i) and (ii). As used herein, "ethylenically unsaturated" refers to a group having at least one carbon-carbon double bond. Non-limiting examples of ethylenically unsaturated groups include, but are not limited to, (meth)acrylate groups, vinyl groups, other alkenes, and combinations thereof. As used herein, the term "(meth) acrylate" refers to both the methacrylate and the acrylate.

The ethylenically unsaturated compound can comprise ethylenically unsaturated monomers and/or polymers. The ethylenically unsaturated compounds can also comprise mono-ethylenically unsaturated compounds, multi-ethylenically unsaturated compounds, or combinations thereof. A "mono-ethylenically unsaturated compound" refers to a compound comprising only one ethylenically unsaturated group, and a "multi-ethylenically unsaturated compound" refers to a compound comprising two or more ethylenically unsaturated groups.

The ethylenically unsaturated compounds can comprise a linear, branched, or cyclic compound. The term "linear" refers to a compound having a straight chain, the term "branched" refers to a compound having a chain with a hydrogen replaced by a substituent such as an alkyl group that branches or extends out from a straight chain, and the term "cyclic" refers to a closed ring structure. Further, the cyclic structures can comprise aromatic rings and/or aliphatic rings. As used herein, the term "aromatic" refers to a conjugated cyclic hydrocarbon structure with a stability (due to delocalization) that is significantly greater than that of a hypothetical localized structure. An aliphatic ring refers to a non-aromatic structure that contains saturated carbon bonds.

As indicated, the reactants that form the carboxylic acid functional polyol polymer can include an ethylenically unsaturated compound comprising carboxylic acid functional groups, or the anhydride thereof. The compound can comprise one or multiple carboxylic acid groups or the anhydride thereof. Non-limiting examples of ethylenically unsaturated compounds comprising carboxylic acid functional groups, or the anhydride thereof, include (meth) acrylic acid, allylacetic acid, crotonic acid, vinylacetic acid, itaconic acid, maleic acid, fumaric acid, itaconic anhydride, maleic anhydride, isobutenyl succinic anhydride, citraconic anhydride, tetrahydrophthalic anhydride, octenyl succinic anhydride, and any combination thereof. When the compound comprises multiple carboxylic acid groups, or an anhydride, partial esters of the compound can be utilized.

The ethylenically unsaturated compound comprising carboxylic acid functional groups, or the anhydride thereof, can comprise at least 5 weight %, or at least 8 weight %, based on the total solids weight of the reactants used to form the carboxylic acid functional polyol polymer. The ethylenically unsaturated compound comprising carboxylic acid functional groups, or the anhydride or ester thereof, can also comprise up to 20 weight %, up to 15 weight %, or up to 10 weight %, based on the total solids weight of the reactants used to form the carboxylic acid functional polyol polymer. The ethylenically unsaturated compound comprising carboxylic acid functional groups, or the anhydride or ester thereof, can comprise an amount within a range such as from 5 weight % to 20 weight %, or from 5 weight % to 15 weight %, or from 5 weight % to 10 weight %, based on the total solids weight of the reactants used to form the carboxylic acid functional polyol polymer.

The reactants that form the carboxylic acid functional polyol polymer can further include an ethylenically unsaturated compound comprising hydroxyl functional groups. The compound can comprise one or multiple hydroxyl groups. Non-limiting examples of ethylenically unsaturated compounds comprising hydroxyl functional groups include hydroxyalkyl esters of (meth)acrylic acid such as hydroxymethyl (meth)acrylate, hydroxyethyl (meth)acrylate, hydroxypropyl (meth)acrylate, hydroxybutyl (meth)acrylate, and combinations thereof.

The ethylenically unsaturated compound comprising hydroxyl functional groups can comprise at least 8 weight %, at least 10 weight %, at least 12 weight %, or at least 15%, based on the total solids weight of the reactants used to form the carboxylic acid functional polyol polymer. The ethylenically unsaturated compound comprising hydroxyl functional groups can also comprise up to 40 weight %, or up to 35 weight %, based on the total solids weight of the reactants used to form the carboxylic acid functional polyol polymer. The ethylenically unsaturated compound comprising hydroxyl functional groups can comprise an amount within a range such as from 8 weight % to 40 weight %, or from 10 weight % to 40 weight %, or from 12 weight % to 35 weight %, or from 15 weight % to 35 weight %, based on the total solids weight of the reactants used to form the carboxylic acid functional polyol polymer.

As previously described, the reactants that form the carboxylic acid functional polyol polymer can further include an ethylenically unsaturated compound that is different from (i) and (ii). That is, the ethylenically unsaturated compound that is different from (i) and (ii) is selected from ethylenically unsaturated compounds that do not include carboxylic acid and hydroxyl functional groups. The ethylenically unsaturated compound that is different from (i) and (ii) can include other functional groups, such as epoxy functional groups for example. Alternatively, the ethylenically unsaturated compound that is different from (i) and (ii) can comprise a non-functional ethylenically unsaturated compound. As used herein, a "non-functional ethylenically unsaturated compound" refers to a compound that only contains ethylenically unsaturated groups and is free of all other reactive functional groups.

The ethylenically unsaturated compound that is different from (i) and (ii) can comprise a multi-ethylenically unsaturated compound such as a non-functional multi-ethylenically unsaturated compound, a mono-ethylenically unsaturated compound having an abstractable hydrogen, or a combination hereof.

As used herein, an "abstractable hydrogen" refers to a hydrogen on a compound that is removed from the compound by a radical. Non-limiting examples of abstractable hydrogen atoms are hydrogen atoms bonded to tertiary carbon atoms such as the hydrogen atoms bonded to the tertiary carbons on 2-ethylhexyl acrylate and isobornyl acrylate. The reactants that form the carboxylic acid functional polyol polymer can comprise one or multiple ethylenically unsaturated compounds having abstractable hydrogens. For instance, the reactants that form the carboxylic acid functional polyol polymer can comprise a linear or branched mono-ethylenically unsaturated compound having an abstractable hydrogen and a cyclic mono-ethylenically unsaturated compound having an abstractable hydrogen.

Non-limiting examples of suitable ethylenically unsaturated compounds that are different from (i) and (ii) include styrene, σ-methyl styrene, 2,4-dimethylstyrene, ethylstyrene, isopropylstyrene, butylstyrene, vinyl naphthalene, vinyl toluene, ethylene, propylene, 1-butene, 1-pentene, 1-hexene, 1-octene, 1-octadec ene, 3-methyl-1-butene, 4-methyl-1-pentene, cyclopentene, 1,4-hexadiene, 1,5-hexadiene, and divinylbenzene, methyl acrylate, methyl methacrylate, ethyl acrylate, ethyl methacrylate, butyl acrylate, butyl methacrylate, isobutyl acrylate, isobutyl methacrylate, isobornyl acrylate, isobornyl methacrylate, ethylhexyl acrylate, ethylhexyl methacrylate, lauryl methacrylate, lauryl acrylate, octyl acrylate, octyl methacrylate, glycidyl methacrylate, vinyl methacrylate, acetoacetoxyethyl methacrylate, acetoacetoxyethyl acrylate, acetoacetoxypropyl methacrylate, acetoacetopropryl acrylate, di-n-butyl maleate, di-octylmaleate, acrylonitrile, $C_3$-$C_{30}$ vinyl esters, $C_3$-$C_{30}$ vinyl ethers, and combinations thereof.

The ethylenically unsaturated compound(s) that is/are different from (i) and (ii) can comprise at least 50 weight %, at least 55 weight %, or at least 60 weight %, based on the total solids weight of the reactants used to form the carboxylic acid functional polyol polymer. The ethylenically unsaturated compound(s) that is/are different from (i) and (ii) can comprise up to 80 weight %, up to 75 weight %, or up to 70 weight %, based on the total solids weight of the reactants used to form the carboxylic acid functional polyol polymer. The ethylenically unsaturated compound(s) that is/are different from (i) and (ii) can comprise an amount within a range such as from 50 to 80 weight %, or from 55 to 75 weight %, or from 60 to 70 weight %, based on the total solids weight of the reactants used to form the carboxylic acid functional polyol polymer.

When the ethylenically unsaturated compound(s) that is/are different from (i) and (ii) comprise(s) both a multi-ethylenically unsaturated compound, such as a non-functional multi-ethylenically unsaturated compound, and a mono-ethylenically unsaturated compound having an abstractable hydrogen, the mono-ethylenically unsaturated compound having an abstractable hydrogen can be used in a larger amount, by weight, than the multi-ethylenically unsaturated compound. For instance, the mono-ethylenically unsaturated compound(s) having an abstractable hydrogen can comprise at least two times, at least three times, at least four times, at least five times, or at least six times, the amount of the multi-ethylenically unsaturated compound used to form the carboxylic acid functional polyol polymer.

The carboxylic acid functional polyol polymer can also be formed with other types of reactants, such as other ethylenically unsaturated compounds for example. Alternatively, the carboxylic acid functional polyol polymer can be formed with only the previously described types of reactants.

The carboxylic acid functional polyol polymer can be prepared by mixing and reacting all the desired reactants at the same time. Alternatively, the reactants can be reacted in a stepwise manner by first mixing and reacting only a portion of the reactants to form a preliminary reaction product and then mixing and reacting the remaining reactants with the preliminary reaction product. Various types of reaction aids can also be added to the reaction mixture including, but not limited to, catalysts.

The reactants and other optional components can also be combined and reacted in a liquid medium such as a non-aqueous liquid medium. As used herein, the term "non-aqueous" refers to a liquid medium comprising less than 50 weight % water, based on the total weight of the liquid medium. In accordance with the present invention, such non-aqueous liquid mediums can comprise less than 40 weight % water, or less than 30 weight % water, or less than 20 weight % water, or less than 10 weight % water, or less than 5% water, based on the total weight of the liquid medium. The solvents that make up more than 50 weight % of the liquid medium include organic solvents. Non-limiting examples of suitable organic solvents include polar organic solvents e.g. protic organic solvents (such as glycols, glycol ether alcohols, and alcohols); ketones, glycol diethers, esters, and diesters. Other non-limiting examples of organic solvents include aromatic and aliphatic hydrocarbons.

It is appreciated that the carboxylic acid functional polyol polymer of the present invention can include an addition polymer that comprises carboxylic acid and hydroxyl functional groups. As used herein, an "addition polymer" refers to a polymer at least partially derived from ethylenically unsaturated monomers. For instance, the carboxylic acid functional polyol polymer can comprise a carboxylic acid functional (meth)acrylic polyol polymer in which at least some of the reactants that form the polymer are (meth)acrylic compounds as previously described.

The polymer can also comprise other functional groups such as keto functional groups (also referred to as ketone functional groups), aldo functional groups (also referred to as aldehyde functional groups), amine groups, epoxide groups, thiol groups, carbamate groups, amide groups, urea groups, and combinations thereof. Alternatively, the polymer of the present invention can be free of additional functional groups other than the hydroxyl and carboxylic acid functional groups.

The carboxylic acid functional polyol polymer can have a hydroxyl value within a range of from 60 to 150 mg KOH/g, or from 60 to 130 mg KOH/g, or from 60 to 110 mg KOH/g, or from 60 to 100 mg KOH/g, or from 60 to 90 mg KOH/g, or from 60 to 80 mg KOH/g.

The carboxylic acid functional polyol polymer can have an acid value of at least 30 mg KOH/g, at least 40 mg KOH/g, at least 50 mg KOH/g, at least 55 mg KOH/g, or at least 60 mg KOH/g. The carboxylic acid functional polyol polymer can have an acid value of up to 120 mg KOH/g, up to 110 mg KOH/g, up to 100 mg KOH/g, up to 95 mg KOH/g, or up to 90 mg KOH/g. The carboxylic acid functional polyol polymer can have an acid value within a range of from 30 to 120 mg KOH/g, or from 40 to 110 mg KOH/g, or from 50 to 100 mg KOH/g, or from 50 to 95 mg KOH/g, or from 55 to 95 mg KOH/g.

Acid values and hydroxyl values are determined using a Metrohm 798 MPT Titrino automatic titrator according to ASTM D 4662-15 and ASTM E 1899-16.

The carboxylic acid functional polyol polymer can have glass transition temperature ($T_g$) within a range of from −20 to 50° C., or from −10 to 40° C. The Tg is determined according to ASTM D6604-00(2013) using a heat-flux differential scanning calorimetry (DSC) with the following parameters, sample pans: aluminium, reference: blank, calibration: indium and mercury, sample weight: 10 mg, heating rate: 20° C./min.

The carboxylic acid functional polyol polymer can comprise a weight average molecular weight of at least 5,000 g/mol, at least 10,000 g/mol, or at least 20,000 g/mol. The carboxylic acid functional polyol polymer can comprise a weight average molecular weight of up to 100,000 g/mol, up to 75,000 g/mol, up to 50,000 g/mol, or up to 30,000 g/mol. The carboxylic acid functional polyol polymer can comprise a weight average molecular weight within a range of from 5,000 g/mol to 100,000 g/mol, or from 5,000 g/mol to 50,000 g/mol, or from 10,000 g/mol to 50,000 g/mol, or from 10,000 g/mol to 30,000 g/mol.

The carboxylic acid functional polyol polymer can comprise a number average molecular weight of at least 1,300 g/mol, or at least 1,500 g/mol. The carboxylic acid functional polyol polymer can comprise a number average molecular weight of up to 4,000 g/mol, up to 3,500 g/mol, or up to 3,000 g/mol. The carboxylic acid functional polyol polymer can comprise a number average molecular weight within a range of from 1,300 g/mol to 4,000 g/mol, or from 1,300 g/mol to 3,500 g/mol, or from 1,500 g/mol to 3,000 g/mol.

The weight average molecular weight and number average molecular weight are determined by Gel Permeation Chromatography using a Waters 2695 separation module with a Waters 410 differential refractometer (RI detector) and polystyrene standards in which tetrahydrofuran (THF) is used as the eluent at a flow rate of 1 ml/min and two PL Gel Mixed C columns are used for separation.

The carboxylic acid functional polyol polymer can comprise at least 10 weight %, at least 30 weight %, or at least 35 weight % of the coating composition, based on the resin solids weight of the coating composition. The carboxylic acid functional polyol polymer can comprise up to 85 weight %, up to 70 weight %, or up to 60 weight % of the coating composition, based on the resin solids weight of the coating composition. The carboxylic acid functional polyol polymer can comprise from 10 to 85 weight %, from 30 to 70 weight %, or from 35 to 60 weight % of the coating composition, based on the resin solids weight of the coating composition.

As previously described, the coating composition comprises a melamine-formaldehyde crosslinker reactive with the carboxylic acid functional polyol polymer. As used herein, the term "crosslinker" refers to a molecule comprising two or more functional groups that are reactive with other functional groups and which is capable of linking two or more monomers or polymer molecules through chemical bonds such as during a curing process. Thus, the coating composition comprises a melamine-formaldehyde crosslinker that is reactive with at least some of the functional groups on the carboxylic acid functional polyol polymer.

The melamine-formaldehyde crosslinker used with the present invention comprises 35 mole % or less of imino groups and methylol groups taken together, 30 mole % or less of imino groups and methylol groups taken together, 25 mole % or less of imino groups and methylol groups taken together, or 23 mole % or less of imino groups and methylol groups taken together, or 20 mole % or less of imino groups and methylol groups taken together, based on the total functionality of the melamine-formaldehyde crosslinker. The melamine-formaldehyde crosslinker used with the present invention can also comprise 5 mole % or greater of imino groups and methylol groups taken together, or 8 mole % or greater of imino groups and methylol groups taken together, or 10 mole % or greater of imino groups and methylol groups taken together, or 12 mole % or greater of imino groups and methylol groups taken together, based on the total functionality of the melamine-formaldehyde crosslinker, or 14 mole % or greater of imino groups and methylol groups taken together, based on the total functionality of the melamine-formaldehyde crosslinker. The melamine-formaldehyde crosslinker used with the present invention can also comprise an amount within a range such as, for example, from 5 mole % to 35 mole % of imino groups and methylol groups taken together, or from 10 mole % to 35 mole % of imino groups and methylol groups taken together, or from 12 mole % to 35 mole % of imino groups and methylol groups taken together, or from 12 mole % to 30 mole % of imino groups and methylol groups taken together, or from 12 mole % to 25 mole % of imino groups and methylol groups taken together, based on the total functionality of the melamine-formaldehyde crosslinker.

Moreover, the melamine-formaldehyde crosslinker used with the present invention comprises 5 mole % or greater of butyl groups and isobutyl groups taken together, or 10 mole % or greater of butyl groups and isobutyl groups taken together, or 15 mole % or greater of butyl groups and isobutyl groups taken together, or 18 mole % or greater of butyl groups and isobutyl groups taken together, or 20 mole % or greater of butyl groups and/or isobutyl groups, based on the total functionality of the melamine-formaldehyde crosslinker. The melamine-formaldehyde crosslinker used with the present invention can also comprise 70 mole % or less of butyl groups and isobutyl groups taken together, or 65 mole % or less of butyl groups and isobutyl groups taken together, or 60 mole % or less of butyl groups and isobutyl groups taken together, or 55 mole % or less of butyl groups and isobutyl groups taken together, or 50 mole % or less of butyl groups and isobutyl groups taken together, or 45 mole % or less of butyl groups and isobutyl groups taken together, or 40 mole % or less of butyl groups and isobutyl groups taken together, or 35 mole % or less of butyl groups and isobutyl groups taken together, or 30 mole % or less of butyl groups and isobutyl groups taken together, or 25 mole % or less of butyl groups and isobutyl groups taken together, based on the total functionality of the melamine-formaldehyde crosslinker. The melamine-formaldehyde crosslinker used with the present invention can also comprise an amount within a range such as, for example, from 5 mole % to 70 mole % of butyl groups and isobutyl groups taken together, or from 10 mole % to 65 mole % of butyl groups and isobutyl groups taken together, or from 15 mole % to 65 mole % of butyl groups and isobutyl groups taken together, or from 15 mole % to 35 mole % of butyl groups and isobutyl groups taken together, or from 15 mole % to 25 mole % of butyl groups and isobutyl groups taken together, based on the total functionality of the melamine-formaldehyde crosslinker.

The mole % of the functional groups on the melamine resin is determined by quantitative $^{13}$C-NMR. Quantitative $^{13}$C-NMR data was acquired in a Bruker Avance II spectrometer operating at a carbon frequency of 75.48 MHz NMR. Dimethyl sulfoxide-$d_6$ (DMSO-$d_6$) was used as the NMR solvent. Cr(acac)$_3$ was used as a relaxation agent for quantitative $^{13}$C NMR, which was recorded with relaxation times of 3 s, a pulse angle of 90 degree, and an acquisition time of 0.66 s. One possible structure of a melamine resin is shown below. Each triazine ring is substituted by six functional groups. In the structure shown below, the triazine is substituted with one imino group (—NH), one methylol group (—CH$_2$OH), two methoxy groups (—CH$_2$OMe), one n-butoxy group (—CH$_2$OBu) and one isobutoxy group (—CH$_2$OisoBu). A fraction of the six functional groups on each triazine ring may be bridges to other triazine rings (often referred to as crosslinks). These bridges should still be considered as functional groups for the sake of calculating the percentage functional groups on the melamine that are imino or methylol. Specifically, as will be seen below, since the level of imino groups cannot be determined directly by $^{13}$C-NMR, it has to be determined by difference between the theoretical six functional groups per triazine ring and the level other functional groups (which can be determined directly). The bridge groups, the level of which can be determined by $^{13}$C-NMR, should be included when performing this calculation.

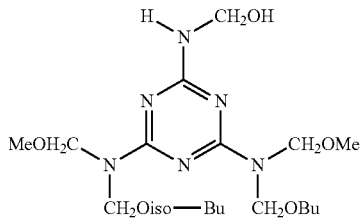

Examples of characteristic $^{13}$C-NMR peaks for typical substituents are 55 ppm (—OMe), 28 ppm (iso-Bu), 90 ppm (bridge or crosslink), 13/31.5/64 ppm (-nBu). The carbon peak for —NCH$_2$OH shows up in the range of 66 to 70 ppm, and carbon peaks for —NCH$_2$OR shows up in the range of 70-79 ppm (where R includes an alkoxy group or a bridge group to another triazine ring). Further, —NCH$_2$OH/—NCH$_2$OR carbon peaks could be overlapping with substituent or solvent peaks. Therefore, these peaks from substituents or solvents are considered to calculate the mole % of imino group or methylol group.

When using the $^{13}$C-NMR data to calculate the percentage of melamine functional groups that are imino and/or methylol, the triazine ring carbons (166 ppm) are normalized to be 3. For each triazine ring, there are theoretically 6 substituents. Mole % of NH and methylol are calculated from the peak intensities after normalizing the triazine ring carbons to 3.

The previously described procedure is illustrated for two melamines, Resimene® HM 2608 (melamine formaldehyde resin, commercially available from INEOS) and Cymel® 202 (melamine formaldehyde resin, commercially available from Allnex), using the $^{13}$C-NMR obtained for these melamines.

The mole % of imino groups is calculated using the following equation 1: Mole % imino=100×$(6-I_{NCH2OR}-I_{NCH2OR})/6$. Further, the mole % of methylol groups is calculated by equation 2: Mole % methylol=100×$(I_{NCH2OR})/6$.

With respect to equations 1 and 2, R is the alkyl group and $I_{NCH2OR}$ is the peak intensity of —NCH$_2$OR carbons, which can be obtained by $I_{NCH2OR} = I_{(70-79\ ppm)} - I_{isoBu\ substituent\ (28\ ppm)}$. Further, $I_{NCH2OR}$ is the peak intensity of —NCH$_2$OH carbons, which can be obtained by $I_{NCH2OR} = I_{(66-70\ ppm)} - I_{nBu\ substituent\ (31.5\ ppm)} - I_{isoButanol\ (30.5\ ppm)}$.

For Resimene® HM 2608, the mole % calculation for imino using equation 1 is illustrated as follows: Mole % imino=100×$(6-I_{NCH2OR}\ I_{NCH2OR})/6$=100×[6−(3.55-0.12)−(1.19-0.55)]/6=32.2%. For Resimene® HM 2608, the mole % calculation for methylol using equation 2 is illustrated as follows: Mole % methylol=100×$(I_{NCH2OR})/6$=100×(0.64)/6=10.7%.

For Cymel® 202, the mole % calculation for imino using equation 1 is illustrated as follows: Mole % imino=100×(6−$I_{NCH2OR}-I_{NCH2OR}$)/6=100×[6−2.59−(1.93-1.23)]/6=45.2%. For Cymel® 202, the mole % calculation for methylol using equation 2 is illustrated as follows: Mole % methylol=100×$(I_{NCH2OR})/6$=100×(0.7)/6=11.7%.

The previously described method of determining the mole % of the functional groups on the melamine resin is referred to herein as the "melamine functional group mole % method". It will be appreciated that the presence of other components or other types of substituents or solvents could generate additional peaks not described above or interfere with peak integrals, for example, NCH$_2$OR carbons (70-79 ppm) in 13C NMR, and their contribution would be considered for calculation of imino and methylol functionalities, for example.

It was found that a melamine-formaldehyde crosslinker comprising the previously described amounts of functional groups can react with the carboxylic acid functional polyol polymer of the present invention at low temperatures to form a coating with desirable properties. For example, the coating composition can be cured at a temperature of 100° C. or less, 90° C. or less, or 80° C. or less. The coating composition can be cured at the previously described temperatures in a period of time of 1 hour or less, or 30 minutes or less, or 20 minutes or less.

The melamine-formaldehyde crosslinker can comprise at least 12 weight %, at least 15 weight %, or at least 20 weight % of the coating composition, based on the resin solids weight of the coating composition. The melamine-formaldehyde crosslinker can comprise up to 30 weight %, up to 28 weight %, or up to 26 weight % of the coating composition, based on the resin solids weight of the coating composition. The melamine-formaldehyde crosslinker can comprise from 12 to 30 weight %, from 15 to 28 weight %, or from 20 to 26 weight % of the coating composition, based on the resin solids weight of the coating composition.

The coating composition of the present invention also includes an acid catalyst. That is, the coating composition utilizes an external acid catalyst to increase the reaction rate between the melamine-formaldehyde crosslinker and the carboxylic acid functional polyol polymer to cure the coating composition. Non-limiting examples of acid catalysts that can be used with the coating compositions of the present invention include sulfonic acid, p-toluene sulfonic acid, naphthalene sulfonic acid, sulfuric acid, hydrochloric acid, phosphoric acid, oxalic acid, citric acid, dodecylbenzenesulfonic acid, or any combination thereof.

The acid catalyst can comprise 5 weight % or less, or 4 weight % or less, or 3 weight % or less, based on the resin solids weight of all hydroxyl functional polymers used in the coating composition. The acid catalyst can comprise at least 0.5 weight %, or at least 1 weight %, or at least 2 weight % of the coating composition, based on the resin solids weight of all hydroxyl functional polymers used in the coating composition. The acid catalyst can comprise an amount within a range such as, for example, from 0.5 to 5 weight %, or from 1 to 3 weight %, of the coating composition, based on the resin solids weight of all hydroxyl functional polymers used in the coating composition.

The coating composition further comprises a non-aqueous liquid medium. The non-aqueous liquid medium comprises one or more organic solvents that make up more than 50 weight % of the liquid medium as previously defined. As such, the components that form the coating composition are combined and mixed in a non-aqueous liquid medium and therefore are solvent-borne coating compositions.

The coating composition can also comprise additional components. For example, the coating composition can also comprise additional film-forming resins. The additional resins can include any of a variety of thermoplastic and/or thermosetting resins known in the art. As used herein, the term "thermosetting" refers to resins that "set" irreversibly upon curing or crosslinking, wherein the polymer chains are joined together by covalent bonds. This property is usually associated with a cross-linking reaction often induced, for example, by heat or radiation. Curing or crosslinking reactions also may be carried out under ambient conditions. Once cured, a thermosetting resin will not melt upon the application of heat and is insoluble in solvents. As noted, the additional resins can also include a thermoplastic resin. As used herein, the term "thermoplastic" refers to resins that include polymeric components that are not joined by covalent bonds and, thereby, can undergo liquid flow upon heating.

The additional film-forming resins can be selected from, for example, polyester polymers, polyurethanes, polyamide polymers, polyether polymers, polysiloxane polymers, epoxy resins, copolymers thereof, and mixtures thereof. Thermosetting resins typically comprise reactive functional groups. The reactive functional groups can include, but are not limited to, hydroxyl groups, amine groups, epoxide groups, alkoxy groups, thiol groups, carbamate groups, amide groups, urea groups, and combinations thereof.

Thermosetting resins are typically reacted with a crosslinker. As such, when additional film-forming resins are used in the coating composition, the additional film-forming resins can be reactive with additional crosslinkers and/or the melamine-formaldehyde crosslinker. Non-limiting examples of such crosslinkers include aziridines, epoxy resins, anhydrides, alkoxysilanes, carbodiimides, polyhydrazides, polyamines, polyamides, isocyanates and blocked isocyanates, and any combination thereof. The thermosetting resins can also have functional groups that are reactive with themselves; in this manner, such resins are self-crosslinking.

The coating composition of the present invention can also be substantially free, essentially free, or completely free of any of the additional resins and/or crosslinkers such as, for example, being substantially free, essentially free, or completely free of isocyanates and blocked isocyanates. The terms "substantially free of additional resins and/or crosslinkers" means that the coating composition contains less than 1000 parts per million (ppm) of additional resins and/or crosslinkers, "essentially free of additional resins and/or crosslinkers" means that the coating composition contains less than 100 ppm of additional resins and/or crosslinkers, and "completely free of additional resins and/or crosslinkers" means that the coating composition contains less than 20 parts per billion (ppb) of additional resins and/or crosslinkers. The weight is based on the total weight of the composition.

A non-limiting example of an additional film-forming resin that can be used with the coating composition of the present invention and which can be used to further improve the final coating properties is a polyester polyol (i.e., a polyester comprising two or more hydroxyl groups). Such polymers may be prepared in a known manner by condensation of polyhydric alcohols and polycarboxylic acids. Suitable polyhydric alcohols include ethylene glycol, propylene glycol, butylene glycol, 1,6-hexylene glycol, neopentyl glycol, diethylene glycol, glycerol, trimethylolpropane, pentaerythritol, and dimethylol propionic acid. Suitable polycarboxylic acids include succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the polycarboxylic acids such as anhydrides where they exist or lower alkyl esters of the polycarboxylic acids such as the methyl esters may be used.

When incorporated into the coating composition, the polyester polyol can comprise 55 weight % or less, or 40 weight % or less, or 35 weight % or less, based on the resin solids weight of the coating composition.

The carboxylic acid functional polyol polymer can also comprise an acid value selected within a certain range and which affects the amount of the polyester polyol used in the coating composition. For instance, when the carboxylic acid functional polyol polymer has an acid value within a range of from 75 to 120 mg KOH/g, the polyester polyol comprises less than 15 weight % of the coating composition, based on the resin solids weight of the coating composition. Alternatively, when the carboxylic acid functional polyol polymer has an acid value within a range of from 30 to less than 75 mg KOH/g, the polyester polyol comprises from 30 to 55 weight % of the coating composition, based on the resin solids weight of the coating composition. It is appreciated that the polyester polyol can react with the melamine-formaldehyde resin or, if present, an additional crosslinker.

The coating compositions can also comprise a colorant. As used herein, "colorant" refers to any substance that imparts color and/or other opacity and/or other visual effect to the composition. The colorant can be added to the coating in any suitable form, such as discrete particles, dispersions, solutions, and/or flakes. A single colorant or a mixture of two or more colorants can be used in the coatings of the present invention.

Example colorants include pigments (organic or inorganic), dyes and tints, such as those used in the paint industry and/or listed in the Dry Color Manufacturers Association (DCMA), as well as special effect compositions. A colorant may include, for example, a finely divided solid powder that is insoluble, but wettable, under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, diazo, naphthol AS, benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, and mixtures thereof.

Example dyes include, but are not limited to, those that are solvent and/or aqueous based, such as phthalo green or blue, iron oxide, bismuth vanadate, anthraquinone, perylene, and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions Division of Eastman Chemical, Inc.

Other non-limiting examples of components that can be used with the coating compositions of the present invention include plasticizers, abrasion resistant particles, fillers including, but not limited to, micas, talc, clays, inorganic minerals, anti-oxidants, hindered amine light stabilizers, UV light absorbers and stabilizers, surfactants, flow and surface control agents, thixotropic agents, reactive diluents, reaction inhibitors, corrosion-inhibitors, and other customary auxiliaries.

After forming the coating composition of the present invention, the composition can be applied to a wide range of substrates known in the coatings industry. For example, the coating composition of the present invention can be applied to automotive substrates (e.g. automotive vehicles including but not limited to cars, buses, trucks, trailers, etc.), industrial substrates, aircraft and aircraft components, marine substrates and components such as ships, vessels, on-shore and off-shore installations, storage tanks, windmills, nuclear plants, packaging substrates, wood flooring and furniture, apparel, electronics, including housings and circuit boards, glass and transparencies, sports equipment, including golf balls, stadiums, buildings, bridges, and the like. These substrates can be, for example, metallic or non-metallic.

Metallic substrates include, but are not limited to, tin, steel (including electrogalvanized steel, cold rolled steel, hot-dipped galvanized steel, steel alloys or blasted/profiled steel, among others), aluminum, aluminum alloys, zinc-aluminum alloys, steel coated with a zinc-aluminum alloy, and aluminum plated steel. As used herein, blasted or profiled steel refers to steel that has been subjected to abrasive blasting and which involves mechanical cleaning by continuously impacting the steel substrate with abrasive particles at high velocities using compressed air or by centrifugal impellers. The abrasives are typically recycled/reused materials and the process can efficiently removal mill scale and rust. The standard grades of cleanliness for abrasive blast cleaning is conducted in accordance with BS EN ISO 8501-1.

Further, non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethylene terephthalate) (PET), polycarbonate, polycarbonate acrylobutadiene styrene (PC/ABS), polyamide, wood, veneer, wood composite, particle board, medium density fiberboard, cement, stone, glass, paper, cardboard, textiles, leather both synthetic and natural, and the like.

The coating compositions of the present invention can be applied by any means standard in the art, such as electrocoating, spraying, electrostatic spraying, dipping, rolling, brushing, and the like. The coatings formed from the coating compositions of the present invention can be applied to a dry film thickness of, for example, 20 to 100 microns, 30 to 70 microns, or from 40 to 50 microns.

The coating composition can be applied to a substrate to form a monocoat. As used herein, a "monocoat" refers to a single layer coating system that is free of additional coating layers. Thus, the coating composition comprising the corrosion inhibitor can be applied directly to a substrate without any intermediate coating layer and cured to form a single layer coating, i.e. a monocoat. The coating composition can also be applied directly over a pretreated substrate as a monocoat. For example, the substrate can be pretreated with an iron phosphate treatment, zinc phosphate treatment, zirconium treatment, titanium treatment, or silane treatment.

Alternatively, the coating composition comprising can be applied to a substrate as a first coating layer along with additional coating layers, such as a second coating layer, to form a multi-layer coating system. It is appreciated that the multi-layer coating can comprise multiple coating layers such as three or more, or four or more, or five or more coating layers. For example, the previously described coating composition comprising the present invention can be applied to a substrate as a primer and second and third coating layers, and optionally as additional coatings layers, and can be applied over the primer layer as basecoats and/or topcoats. As used herein, a "primer" refers to a coating composition from which an undercoating may be deposited onto a substrate in order to prepare the surface for application of a protective or decorative coating system. A "basecoat" refers to a coating composition from which a coating is deposited onto a primer and/or directly onto a substrate, optionally including components (such as pigments) that impact the color and/or provide other visual impact, and which may be overcoated with a protective and decorative topcoat.

The additional coating layers, such as a second and third coating layer, can be formed from a coating composition that includes a film-forming resin that is the same or different from the first coating layer. The additional coating layers can be prepared with any of the film-forming resins, cross-linkers, colorants, and/or other components previously described. Further, each coating composition can be applied as a dry-on-dry process where each coating composition is dried or cured to form a coating layer prior to application of another coating composition. Alternatively, all or certain combinations of each coating composition described herein can be applied as a wet-on-wet process and dried or cured together, such as two or more, or three or more, compositions applied in a wet-on-wet process. The multi-layer coatings can also be prepared with a primer layer, a first basecoat applied over at least a portion of the primer layer, a second basecoat applied over at least a portion of the second basecoat layer, and a topcoat applied over at least a portion of the second basecoat layer in which at least one of the layers, such as the first and/or second basecoat or the topcoat, are prepared from the coating composition of the present invention previously described.

The coating layer or layers prepared with the coating composition previously described can be a colored layer (e.g. a basecoat), or a clear layer (e.g. a topcoat). As used herein, a "clear coating layer" refers to a coating layer that is at least substantially transparent or fully transparent. The term "substantially transparent" refers to a coating wherein a surface beyond the coating is at least partially visible to the naked eye when viewed through the coating. The term "fully transparent" refers to a coating wherein a surface beyond the coating is completely visible to the naked eye when viewed through the coating. It is appreciated that the clear layer can comprise colorants, such as pigments, provided that the colorants do not interfere with the desired transparency of the clear topcoat layer. Alternatively, the clear layer is free of colorants such as pigments (i.e., unpigmented).

The present invention is also directed to a method of forming a coating over at least a portion of a substrate. The method includes applying the previously described coating composition of the present invention over at least a portion of a substrate and curing the coating composition to form a coating over at least a portion of the substrate. The coating composition can be cured at a temperature of 100° C. or less, 90° C. or less, or 80° C. or less. The coating composition can be cured at the previously described temperatures in a period of time of 1 hour or less, or 30 minutes or less, or 20 minutes or less.

It was found that the coating compositions of the present invention can be cured at comparatively low temperatures, such as the temperatures previously described, to form a coating having a high degree of cure with desirable film properties such as good film hardness. It was also found that the coating compositions of the present invention can provide a stable one-component (1 k) composition that is cured at the previously described temperatures.

As used herein, a "one-component composition" refers to a composition wherein all the coating components are maintained in the same container after manufacture, during storage, etc. In contrast, a multi-component composition, such as a two component composition ("2K") or more, has at least two components that are maintained in a different container after manufacture, during storage, etc. prior to application and formation of the coating over a substrate.

The present invention is also directed to the following aspects.

A first aspect is directed to a coating composition comprising: (a) a carboxylic acid functional polyol polymer comprising an acid value within a range of from 30 to 120 mg KOH/g and a hydroxyl value within a range of from 60 to 150 mg KOH/g; (b) a melamine-formaldehyde crosslinker reactive with the carboxylic acid functional polyol polymer, wherein the melamine-formaldehyde crosslinker comprises imino and methylol groups that together comprise 35 mole % or less of the total functionality of the melamine-formaldehyde crosslinker, and wherein the melamine-formaldehyde crosslinker comprises butyl groups and isobutyl groups that together comprise 5 mole % or greater of the total functionality of the melamine-formaldehyde crosslinker; (c) an acid catalyst; and (d) a non-aqueous liquid medium, wherein the coating composition cures at a temperature of 100° C. or less.

A second aspect is directed to the coating composition of the first aspect, wherein the carboxylic acid functional polyol polymer is obtained from reactants comprising: (i) an ethylenically unsaturated compound comprising hydroxyl functional groups; (ii) an ethylenically unsaturated compound comprising carboxylic acid functional groups, or an anhydride thereof; and (iii) an ethylenically unsaturated compound that is different from (i) and (ii).

A third aspect is directed to the coating composition of the first or second aspects, wherein the acid catalyst comprises 5 weight % or less of the coating composition, based on the resin solids weight of all hydroxyl functional polymers in the coating composition.

A fourth aspect is directed to the coating composition of any one of the first through third aspects, wherein the melamine-formaldehyde crosslinker comprises from 12 to 30 weight % of the coating composition, based on the resin solids weight of the coating composition.

A fifth aspect is directed to the coating composition of any one of the first through fourth aspects, wherein the carboxylic acid functional polyol polymer has an acid value within a range of from 50 to 95 mg KOH/g.

A sixth aspect is directed to the coating composition of any one of the first through fifth aspects, wherein the carboxylic acid functional polyol polymer has a hydroxyl value within a range of from 60 to 100 mg KOH/g.

A seventh aspect is directed to the coating composition of any one of the first through sixth aspects, wherein the carboxylic acid functional polyol polymer has glass transition temperature within a range of from −20 to 50° C.

An eighth aspect is directed to the coating composition of any one of the first through seventh aspects, wherein the carboxylic acid functional polyol polymer has a weight average molecular weight of greater than 5,000 g/mol.

A ninth aspect is directed to the coating composition of any one of the second through eighth aspects, wherein the ethylenically unsaturated compound comprising hydroxyl functional groups comprises at least 10 weight % of the reactants, based on the total solids weight of the reactants used to form the carboxylic acid functional polyol polymer.

A tenth aspect is directed to the coating composition of any one of the second through ninth aspects, wherein the ethylenically unsaturated compound comprising carboxylic acid functional groups, or the anhydride thereof, comprises at least 5 weight % of the reactants, based on the total solids weight of the reactants used to form the carboxylic acid functional polyol polymer.

An eleventh aspect is directed to the coating composition of any one of the second through tenth aspects, wherein the ethylenically unsaturated compound that is different from (i) and (ii) comprises a multi-ethylenically unsaturated compound, a mono-ethylenically unsaturated compound having an abstractable hydrogen, or a combination thereof.

A twelfth aspect is directed to the coating composition of the eleventh aspect, wherein the ethylenically unsaturated compound that is different from (i) and (ii) comprises at least two different mono-ethylenically unsaturated compounds having an abstractable hydrogen.

A thirteenth aspect is directed to the coating composition of any one of the second through twelfth aspects, wherein the ethylenically unsaturated compound that is different from (i) and (ii) comprises at least 50 weight % of the reactants, based on the total solids weight of the reactants used to form the carboxylic acid functional polyol polymer.

A fourteenth aspect is directed to the coating composition of any one of the first through thirteenth aspects, further comprising a polyester polyol.

A fifteenth aspect is directed to the coating composition of the fourteenth aspect, wherein the polyester polyol comprises less than 15 weight % of the coating composition, based on the resin solids weight of the coating composition.

A sixteenth aspect is directed to the coating composition of the fourteenth aspect, wherein the polyester polyol comprises from 30 to 55 weight % of the coating composition, based on the resin solids weight of the coating composition.

A seventeenth aspect is directed to a substrate at least partially coated with a coating formed from the coating composition of any one of the first through sixteenth aspects.

An eighteenth aspect is directed to the substrate of the seventeenth aspect, wherein the coating composition is applied directly over at least a portion of the substrate.

A nineteenth aspect is directed to the substrate of the seventeenth aspect, wherein the coating composition is applied over at least a portion of a first coating layer formed over at least a portion of the substrate.

A twentieth aspect is directed to a method of forming a coating over at least a portion of a substrate comprising: applying a coating composition over at least a portion of a substrate, the coating composition comprising: (a) a carboxylic acid functional polyol polymer comprising an acid value within a range of from 30 to 120 mg KOH/g and a hydroxyl value within a range of from 60 to 150 mg KOH/g; (b) a melamine-formaldehyde crosslinker reactive with the carboxylic acid functional polyol polymer, wherein the melamine-formaldehyde crosslinker comprises imino and methylol groups that together comprise 35 mole % or less of the total functionality of the melamine-formaldehyde crosslinker, and wherein the melamine-formaldehyde crosslinker comprises butyl groups and isobutyl groups that together comprise 5 mole % or greater of the total functionality of the melamine-formaldehyde crosslinker; (c) an acid catalyst; and (d) a non-aqueous liquid medium, and curing the coating composition at a temperature of 100° C. or less to form a coating over at least of portion of the substrate.

A twenty-first aspect is directed to the method of the twentieth aspect, wherein the coating composition is cured at a temperature of 90° C. or less to form a coating over at least of portion of the substrate.

A twenty-second aspect is directed to the method of the twentieth or twenty first aspect, further comprising applying one or more additional coating compositions as a wet-on-wet process before or after applying the coating composition comprising components (a)-(d) and curing the coating compositions simultaneously.

A twenty-third aspect is directed to the method of any one of the twentieth through twenty second aspects, wherein the coating composition is the coating composition defined in any of the first through sixteenth aspects.

The following examples are presented to demonstrate the general principles of the invention. The invention should not be considered as limited to the specific examples presented. All parts and percentages in the examples are by weight unless otherwise indicated.

Example 1

Preparation of Polyol Polymers

Polyol polymers A-G were prepared as follows:

Polymer A: First, 247 g SOLVESSO™ 100 (aromatic hydrocarbon fluid, commercially available from ExxonMobil Chemical) was charged into a four-necked round-bottom flask fitted with a thermocouple, mechanical stirrer, and condenser and blanketed with $N_2$. The mixture was heated to 155° C. and held for 10 minutes. After that, an initiator mixture of 80 g SOLVESSO™ 100 and 26.8 g t-butyl peroxyacetate was charged into the flask over 5 hours and 15 minutes. Simultaneously, a monomer mixture of 287.5 g isobornyl acrylate, 287.5 g 2-ethylhexyl acrylate, 115 g hydroxyethyl methacrylate, 76.7 g hexanediol diacrylate, and 103 g SOLVESSO™ 100 was charged into the flask over 5 hours. After the initiator mixture charge was complete, the reaction was held at 155° C. for an additional 1 hour. After that, the polymer was cooled down and discharged. The final measured solid content by weight of the resulting polymer was 62.9%, with a weight average molecular weight of 9696 g/mol as measured by gel Permeation Chromatography using a Waters 2695 separation module with a Waters 410 differential refractometer (RI detector) and polystyrene standards in which tetrahydrofuran (THF) was used as the eluent at a flow rate of 1 ml/min and two PL Gel Mixed C columns used for separation.

Polymer B: First, 250 g butyl acetate was charged into a four-necked round-bottom flask fitted with a thermocouple, mechanical stirrer, and condenser and blanketed with $N_2$. The mixture was heated to 155° C. and held for 10 minutes. After that, an initiator mixture of 80 g butyl acetate and 26.8 g t-butyl peroxyacetate was charged into the flask over 5 hours and 15 minutes. Simultaneously, a monomer mixture of 265 g isobornyl acrylate, 265 g 2-ethylhexyl acrylate, 115 g hydroxyethyl methacrylate, 88 g acrylic acid, and 103 g butyl acetate was charged into the flask over 5 hours. After the initiator mixture charge was complete, the reaction was held at 155° C. for an additional 1 hour. After that, the polymer was cooled down and discharged. The final measured solid content by weight of the resulting polymer was 61.6%, with a weight average molecular weight of 7585 g/mol as measured by gel Permeation Chromatography using a Waters 2695 separation module with a Waters 410 differential refractometer (RI detector) and polystyrene standards in which tetrahydrofuran (THF) was used as the eluent at a flow rate of 1 ml/min and two PL Gel Mixed C columns used for separation.

Polymer C: First, 246.7 g SOLVESSO™ 100 was charged into a four-necked round-bottom flask fitted with a thermocouple, mechanical stirrer, and condenser and blanketed with $N_2$. The mixture was heated to 155° C. and held for 10 minutes. After that, an initiator mixture of 80 g SOLVESSO™ 100 and 26.8 g t-butyl peroxyacetate was charged into the flask over 5 hours and 15 minutes. Simultaneously, a monomer mixture of 552 g isobornyl acrylate, 115 g hydroxyethyl methacrylate, 22 g acrylic acid, 76.7 g hexanediol diacrylate, and 103 g SOLVESSO™ 100 was charged into the flask over 5 hours. After the initiator mixture charge was complete, the reaction was held at 155° C. for an additional 1 hour. After that, the polymer was cooled down and discharged. The final measured solid content by weight of the resulting polymer was 64.7%, with a weight average molecular weight of 8274 g/mol as measured by gel Permeation Chromatography using a Waters 2695 separation module with a Waters 410 differential refractometer (RI detector) and polystyrene standards in which tetrahydrofuran (THF) was used as the eluent at a flow rate of 1 ml/min and two PL Gel Mixed C columns used for separation.

Polymer D: First, 642 g SOLVESSO™ 100 was charged into a four-necked round-bottom flask fitted with a thermocouple, mechanical stirrer, and condenser and blanketed with $N_2$. The mixture was heated to 155° C. and held for 10 minutes. After that, an initiator mixture of 208 g SOLVESSO™ 100 and 69.8 g t-butyl peroxyacetate was charged into the flask over 5 hours and 15 minutes. Simultaneously, a monomer mixture of 667 g isobornyl acrylate, 667 g 2-ethylhexyl acrylate, 299 g hydroxyethyl methacrylate, 159 g acrylic acid, 199 g hexanediol diacrylate and 268 g SOLVESSO™ 100 was charged into the flask over 5 hours. After the initiator mixture charge was complete, the reaction was held at 155° C. for an additional 1 hour. After that, the polymer was cooled down and discharged. The final measured solid content by weight of the resulting polymer was 64.3%, with a weight average molecular weight of 36589 g/mol as measured by gel Permeation Chromatography using a Waters 2695 separation module with a Waters 410 differential refractometer (RI detector) and polystyrene standards in which tetrahydrofuran (THF) was used as the eluent at a flow rate of 1 ml/min and two PL Gel Mixed C columns used for separation.

Polymer E: First, 642 g ethyl 3-ethoxypropionate (EEP) was charged into a four-necked round-bottom flask fitted with a thermocouple, mechanical stirrer, and condenser and blanketed with $N_2$. The mixture was heated to 155° C. and held for 10 minutes. After that, an initiator mixture of 208 g EEP and 69.8 g t-butyl peroxyacetate was charged into the flask over 5 hours and 15 minutes. Simultaneously, a monomer mixture of 908 g isobornyl acrylate, 379 g 2-ethylhexyl acrylate, 284 g hydroxyethyl methacrylate, 196 g acrylic acid, 196 g hexanediol diacrylate, and 255 g EEP was charged into the flask over 5 hours. After the initiator mixture charge was complete, the reaction was held at 155° C. for an additional 1 hour. After that, the polymer was cooled down and discharged. The final measured solid content by weight of the resulting polymer was 64.6%, with a weight average molecular weight of 22576 g/mol as measured by gel Permeation Chromatography using a Waters 2695 separation module with a Waters 410 differential refractometer (RI detector) and polystyrene standards in which tetrahydrofuran (THF) was used as the eluent at a flow rate of 1 ml/min and two PL Gel Mixed C columns used for separation.

Polymer F: First, 642 g ethyl 3-ethoxypropionate (EEP) was charged into a four-necked round-bottom flask fitted with a thermocouple, mechanical stirrer, and condenser and blanketed with $N_2$. The mixture was heated to 155° C. and held for 10 minutes. After that, an initiator mixture of 198 g EEP and 66.3 g t-butyl peroxyacetate was charged into the flask over 5 hours and 15 minutes. Simultaneously, a monomer mixture of 927 g isobornyl acrylate, 379 g 2-ethylhexyl acrylate, 284 g hydroxyethyl methacrylate, 235 g acrylic acid, 137 g hexanediol diacrylate, and 255 g EEP was charged into the flask over 5 hours. After the initiator mixture charge was complete, the reaction was held at 155° C. for an additional 1 hour. After that, the polymer was cooled down and discharged. The final measured solid content by weight of the resulting polymer was 65.1%, with a weight average molecular weight of 14154 g/mol as measured by gel Permeation Chromatography using a Waters 2695 separation module with a Waters 410 differential refractometer (RI detector) and polystyrene standards in which tetrahydrofuran (THF) was used as the eluent at a flow rate of 1 ml/min and two PL Gel Mixed C columns used for separation.

Polymer G: First, 650 g ethyl 3-ethoxypropionate (EEP) was charged into a four-necked round-bottom flask fitted with a thermocouple, mechanical stirrer, and condenser and blanketed with $N_2$. The mixture was heated to 155° C. and held for 10 minutes. After that, an initiator mixture of 208 g EEP and 69.8 g t-butyl peroxyacetate was charged into the flask over 5 hours and 15 minutes. Simultaneously, a monomer mixture of 689 g isobornyl acrylate, 689 g 2-ethylhexyl acrylate, 299 g hydroxyethyl methacrylate, 229 g acrylic acid, and 268 g EEP was charged into the flask over 5 hours. After the initiator mixture charge was complete, the reaction was held at 155° C. for an additional 1 hour. After that, the polymer was cooled down and discharged. The final measured solid content by weight of the resulting polymer was 62.2%, with a weight average molecular weight of 9409 g/mol as measured by gel Permeation Chromatography using a Waters 2695 separation module with a Waters 410 differential refractometer (RI detector) and polystyrene standards in which tetrahydrofuran (THF) was used as the eluent at a flow rate of 1 ml/min and two PL Gel Mixed C columns used for separation.

The compositional percentage of the components used to form polymers A-G and the resulting polymer properties are shown in Table 1.

TABLE 1

| Component or property | Polymer A | Polymer B | Polymer C | Polymer D | Polymer E | Polymer F | Polymer G |
|---|---|---|---|---|---|---|---|
| Isobornyl acrylate | 37.5 | 36 | 70 | 33.5 | 49 | 49 | 36 |
| 2-ethylhexyl acrylate | 37.5 | 36 | 0 | 33.5 | 19 | 19 | 36 |
| Hydroxyethyl methacrylate | 15 | 16 | 15 | 15 | 15 | 15 | 16 |
| Acrylic acid | 0 | 12 | 3 | 8 | 10 | 12 | 12 |
| Hexanediol diacrylate | 10 | 0 | 10 | 10 | 10 | 7 | 0 |
| $M_w$ [1] | 9696 | 7585 | 8274 | 36589 | 22576 | 14154 | 9409 |
| $M_n$ [1] | 1811 | 2717 | 1678 | 2176 | 2530 | 2332 | 2922 |
| Hydroxyl value (on solids) [2] | 64.5 | 69.0 | 64.5 | 64.5 | 64.5 | 64.5 | 69.0 |
| Acid value (on solids) [2] | 2.1 | 93.2 | 21.1 | 54.5 | 71.4 | 84.2 | 91.4 |
| Gardner-Holdt viscosity [3] | O− | Z+ | Z1+ | Z6 | Z2− | Z2− | Z1+ |
| $T_g$ (° C.) [4] | −6 | −3 | 82 | −2 | 29 | 29 | −3 |

[1] Weight average molecular weight ($M_w$) and number average molecular weight ($M_n$) were determined by Gel Permeation Chromatography using a Waters 2695 separation module with a Waters 410 differential refractometer (RI detector) and polystyrene standards in which tetrahydrofuran (THF) was used as the eluent at a flow rate of 1 ml/min and two PL Gel Mixed C columns used for separation.
[2] Acid values and hydroxyl values were determined using a Metrohm 798 MPT Titrino automatic titrator according to ASTM D 4662-15 and ASTM E 1899-16.
[3] The Gardner-Holdt viscosity was determined by pouring the polymer into a tube having an inside diameter of 10.65 ± 0.025 mm and an outside length of 114 ± 1 mm. The polymer was added until the 100 mm line of the tube was reached. After inserting a cork, the tube was placed into an inversion rack and immersed in a water bath having a temperature of 25 ± 1° C. The polymer filled tube was allowed to stand in the water bath for a minimum of 20 minutes. The inversion rack was then removed from the water bath and quickly rotated at 180°. The rate of travel of an air bubble through the polymer between the 27 and 100 mm lines of the tube was recorded and associated with a corresponding Gardner-Holdt Viscosity.
[4] The glass transition value (Tg) was determined according to ASTM D6604-00(2013) using a heat-flux differential scanning calorimetry (DSC) with the following parameters - sample pans: aluminium, reference: blank, calibration: indium and mercury, sample weight: 10 mg, heating rate: 20° C./min.

Examples 2-8

Preparation of Coating Compositions

Several coating compositions were prepared with the components shown in Table 2.

TABLE 2

| Component | Ex. 2 | Comp. Ex. 3 | Comp. Ex. 4 | Comp. Ex. 5 | Comp. Ex. 6 | Comp. Ex. 7 | Ex. 8 |
|---|---|---|---|---|---|---|---|
| SOLVESSO™ 100 | 4.49 | 6.93 | 6.73 | 2.95 | 4.17 | 1.92 | 7.05 |
| Polymer A | 0 | 0 | 0 | 0 | 10 | 10 | 0 |
| Polymer B | 0 | 0 | 0 | 0 | 0 | 0 | 16.2 |
| Polymer C | 0 | 15.7 | 0 | 10 | 0 | 0 | 0 |
| Polymer D | 10.0 | 0 | 15.7 | 0 | 0 | 0 | 0 |
| Cymel ® 1161 [5] | 2.14 | 2.57 | 0 | 2.14 | 2.10 | 2.14 | 3.45 |
| Resimene ® HM 2608 [6] | 0 | 0 | 2.84 | 0 | 0 | 0 | 0 |
| Dodecyl benzene sulfonic acid | 0.18 | 0.25 | 0.25 | 0.71 | 0.17 | 1.06 | 0.27 |

[5] Highly monomeric, methylated/iso-butylated melamine crosslinker, commercially available from Allnex.
[6] Imino type, highly reactive methylated melamine-formaldehyde resin, commercially available from Ineos.

Examples 2-8 were prepared by mixing the ingredients described in Table 2. All compositions were adjusted to 50% resin solids by weight with the defined amount of SOLVESSO™ 100.

Example 9

Preparation and Evaluation of Coatings

The coating compositions of Examples 2-8 were applied using a 5-mil BYK drawdown bar over steel panels pre-coated with electrodeposition primer ED7400 (available from PPG Industries, Inc.). After flashing at room temperature for 10 minutes, the panels were baked at 80° C. for 30 minutes.

After removal from the oven, the panels were stored for 24 hours under ambient conditions and then tested for solvent resistance using methyl ethyl ketone (MEK) double rubs, according to ASTM D5042-15. The test results are shown in Table 3.

TABLE 3

| Composition used to form coating | MEK double rubs to remove coating |
|---|---|
| Example 2 | >200 |
| Comparative Example 3 | 80 |
| Comparative Example 4 | 60 |
| Comparative Example 5 | 140 |
| Comparative Example 6 | 120 |
| Comparative Example 7 | 130 |
| Example 8 | >200 |

As to the Comparative Examples and in comparison to the present invention: Comparative Example 3 was formed with a polyol polymer having an acid value of 21.1; Comparative Example 4 was formed with a highly imino functional melamine-formaldehyde resin crosslinker; Comparative Example 5 was formed with a polyol polymer having an acid value of 21.1 and a large amount of external catalyst; Comparative Example 6 was formed with a polyol polymer prepared without a carboxylic acid functional component and which had an acid value of 2.1; and Comparative Example 7 was formed with a large amount of external catalyst and a polyol polymer prepared without a carboxylic acid functional component and which has an acid value of 2.1.

As shown in Table 3, Examples 2 and 8 of the present invention exhibited significantly better solvent resistance than Comparative Examples 3-7, which shows that coatings formed from the coating compositions of the present invention provided a better and higher degree of cure.

Comparative Example 10

A coating composition was prepared with a commercial 1K melamine-cured clearcoat (solventborne clearcoat TMAC9000, available from PPG Industries, Inc), which did not contain any external catalyst. The coating composition was applied to the electrocoated steel panel according to Example 9. The resulting coating did not exhibit any significant crosslinking. In order to provide sufficient crosslinking, the coating composition required a high baking temperature of 140° C. for 30 minutes.

Examples 11-13

Preparation of Coating Compositions

Several coating compositions were prepared with the components shown in Table 4.

TABLE 4

| Component | Ex. 11 | Ex. 12 | Ex. 13 |
|---|---|---|---|
| Methyl Amyl Ketone | 22.10 | 22.10 | 20.40 |
| Ethyl 3-Ethoxypropionate | 51.3 | 46.3 | 31.2 |
| Polymer E | 146.8 | 0 | 0 |
| Polymer F | 0 | 145.8 | 0 |
| Polymer G | 0 | 0 | 144.8 |
| CYMEL ® 1161[5] | 31.63 | 31.63 | 30.0 |
| Polysiloxane borate[7] | 2.03 | 2.03 | 0 |
| DISPARLON OX-60[8] | 0.47 | 0.47 | 0 |
| Dodecyl benzene sulfonic acid | 2.53 | 2.53 | 2.40 |

[7]Prepared as described in example D of U.S. Pat. No. 8,871,848, which is incorporated by reference herein.
[8]Surface control agent, commercially available from Kusumoto Chemicals.

Examples 11-13 were prepared by mixing the ingredients described in Table 4. Example 11 contained 51.7% by weight resin solids and had a No. 4 Ford cup viscosity of 35.5 seconds at room temperature. Example 12 contained 53.0% by weight resin solids and had a No. 4 Ford cup viscosity of 35.4 seconds at room temperature. Example 13 contained 53.4% by weight resin solids and had a No. 4 Ford cup viscosity of 30.4 seconds at room temperature.

Example 14

Preparation and Evaluation of Coatings

The coating compositions of Examples 11-13 were applied with a siphon-fed spray gun attached to a Spraymation automatic spraying device over steel panels pre-coated with electrodeposition primer ED7400 (available from PPG Industries, Inc.) in 2 coats. All coated panels were then flashed at room temperature for 8 minutes and then transferred to bake. Examples 11 and 12 were baked at 90° C. for 30 minutes and Example 13 was baked at 80° C. for 30 minutes. After removal from the oven, the panels were stored for 24 hours under ambient condition. The panels were tested for solvent resistance using methyl ethyl ketone (MEK) double rubs, according to ASTM D5042-15, and Fisher micro hardness using a Fischer Technologies H100C Micro hardness Measurement System in accordance with ISO 14577-4:2016. The test results are shown in Table 5.

TABLE 5

| Composition used to form coating | MEK double rubs to remove coating | Fisher micro hardness |
|---|---|---|
| Example 11 | >200 | 130.7 |
| Example 12 | >200 | 122.6 |
| Example 13 | >200 | 133.3 |

As shown in Table 5, Examples 11-13, which were applied using a spraying method, provided good solvent resistance (i.e., high degree of cure) and good film hardness.

Example 15

Preparation and Evaluation of Coatings

Various coatings were prepared from the coating compositional components of Example 2 listed in Table 2, except that different melamine resins were used instead to form the composition and which had a certain mole percentage of methylol and imino functionality as well as a certain mole percentage of butyl and isobutyl functionality as described in Table 6. Further, polymer D, which was used to form the compositions, was mixed with each of the different melamines, respectively, at an 80:20 ratio based on resin solids. The coating compositions were applied using a 5-mil BYK drawdown bar over steel panels pre-coated with electrodeposition primer ED7400 (available from PPG Industries, Inc.). After flashing at room temperature for 10 minutes, the panels were baked at 90° C. for 30 minutes.

Solvent resistance (MEK double rubs) and Fisher micro hardness of the coatings were then evaluated according to the methods previously described. The results are shown in Table 6.

TABLE 6

| Coating Sample | Melamine resin sample [9] | % NH + % CH$_2$OH of total functionality of the melamine (mole %) [9] | % O—Bu + % Iso-OBu of total functionality of the melamine (mole %) [9] | Solvent resistance | Fisher micro hardness |
|---|---|---|---|---|---|
| 1 | A | 13.9 | 23.7 | >200 | 111 |
| 2 | B | 23.1 | 18.7 | >200 | 149 |
| 3 | C | 33.3 | 61.9 | >200 | 98 |
| 4 | D | 41.5 | 2.0 | 110 | 91 |
| 5 | E | 19.7 | 0 | 43 | 48 |

[9] Melamine resin samples A-E contained different mole % levels of imino, methylol, butyl, and isobutyl functional groups and which are shown in Table 6. The mole % of the imino (% NH) and methylol (% CH$_2$OH) functional groups, taken together, and the butyl (% O—Bu) and isobutyl (% Iso-OBu) functional groups, taken together, were determined based on the melamine functional group mole % method previously described herein.

As shown in Table 6, coating samples 1-3 exhibited good solvent resistance and coating hardness and which were prepared with a melamine resin having: (i) imino and methylol functional groups that together comprise 13.9 mole %, 23.1 mole %, and 33.3 mole %, respectively, of the total functionality of the melamine resin; and (ii) butyl and isobutyl functional groups that together comprise 23.7 mole %, 18.7 mole %, and 61.9 mole %, respectively, of the total functionality of the melamine resin.

Further, comparative coating sample 4, which was prepared with a melamine resin having imino and methylol functional groups that together comprise 41.5 mole % of the total functionality of the melamine resin, and butyl and isobutyl functional groups that together comprise 2.0 mole % of the total functionality of the melamine resin, exhibited worse solvent resistance and coating hardness than samples 1-3. In addition, comparative coating sample 5, which was prepared with a melamine resin having imino and methylol functional groups that together comprise 19.7 mole % of the total functionality of the melamine resin, and 0 mole % of butyl and isobutyl functional groups, also exhibited worse solvent resistance and coating hardness than samples 1-3.

Whereas particular embodiments of this invention have been described above for purposes of illustration, it will be evident to those skilled in the art that numerous variations of the details of the present invention may be made without departing from the invention as defined in the appended claims.

The invention claimed is:

1. A coating composition comprising:
   (a) a carboxylic acid functional polyol polymer comprising an acid value within a range of from 50 to 95 mg KOH/g and a hydroxyl value within a range of from 60 to 150 mg KOH/g;
   (b) a melamine-formaldehyde crosslinker reactive with the carboxylic acid functional polyol polymer, wherein the melamine-formaldehyde crosslinker comprises imino and methylol groups that together comprise 35 mole % or less of the total functionality of the melamine-formaldehyde crosslinker, and wherein the melamine-formaldehyde crosslinker comprises butyl groups and isobutyl groups that together comprise 5 mole % or greater of the total functionality of the melamine-formaldehyde crosslinker;
   (c) an acid catalyst;
   (d) a non-aqueous liquid medium, and
   (e) a polyester polyol;
   wherein the coating composition cures at a temperature of 100° C. or less, and wherein when the composition is applied to a substrate and cured to form a cured coating, the cured coating demonstrates a solvent resistance of greater than 200 in methyl ethyl ketone double rubs test according to ASTM D5042-15.

2. The coating composition of claim 1, wherein the carboxylic acid functional polyol polymer is obtained from reactants comprising: (i) an ethylenically unsaturated compound comprising hydroxyl functional groups; (ii) an ethylenically unsaturated compound comprising carboxylic acid functional groups, or an anhydride thereof; and (iii) an ethylenically unsaturated compound that is different from (i) and (ii).

3. The coating composition of claim 1, wherein the acid catalyst comprises 0.5 to 5 weight % of the coating composition, based on the total solids weight of all hydroxyl functional polymers in the coating composition.

4. The coating composition of claim 1, wherein the melamine-formaldehyde crosslinker comprises from 12 to 30 weight % of the coating composition, based on the resin solids weight of the coating composition.

5. The coating composition of claim 1, wherein the carboxylic acid functional polyol polymer has a hydroxyl value within a range of from 60 to 100 mg KOH/g.

6. The coating composition of claim 1, wherein the carboxylic acid functional polyol polymer has glass transition temperature within a range of from −20 to 50° C.

7. The coating composition of claim 1, wherein the carboxylic acid functional polyol polymer has a weight average molecular weight of greater than 5,000 g/mol.

8. The coating composition of claim 2, wherein the ethylenically unsaturated compound comprising hydroxyl functional groups comprises at least 10 weight % of the reactants, based on the total solids weight of the reactants used to form the carboxylic acid functional polyol polymer.

9. The coating composition of claim 2, wherein the ethylenically unsaturated compound comprising carboxylic acid functional groups, or the anhydride, comprises at least 5 weight % of the reactants, based on the total solids weight of the reactants used to form the carboxylic acid functional polyol polymer.

10. The coating composition of claim 2, wherein the ethylenically unsaturated compound that is different from (i) and (ii) comprises a multi-ethylenically unsaturated compound, a mono-ethylenically unsaturated compound having an abstractable hydrogen, or a combination thereof.

11. The coating composition of claim 10, wherein the ethylenically unsaturated compound that is different from (i)

and (ii) comprises at least two different mono-ethylenically unsaturated compounds having an abstractable hydrogen.

12. The coating composition of claim 2, wherein the ethylenically unsaturated compound that is different from (i) and (ii) comprises at least 50 weight % of the reactants, based on the total solids weight of the reactants used to form the carboxylic acid functional polyol polymer.

13. The coating composition of claim 1, wherein the polyester polyol comprises from 30 to 55 weight % of the coating composition, based on the resin solids weight of the coating composition.

* * * * *